United States Patent [19]

Dully et al.

[11] 3,901,460

[45] Aug. 26, 1975

[54] RESTRAINT BELT RETRACTOR WITH PENDULUM ACTUATED LOCKING

[75] Inventors: Floyd I. Dully, Detroit; Henry W. Griffin, Birmingham; Barthold F. Meyer, Bloomfield Hills, all of Mich.

[73] Assignee: General Motors Corporation, Detroit, Mich.

[22] Filed: June 14, 1974

[21] Appl. No.: 479,371

Related U.S. Application Data

[60] Division of Ser. No. 348,963, May 9, 1973, which is a continuation-in-part of Ser. No. 328,877, Feb. 1, 1973, abandoned.

[52] U.S. Cl. .......................................... 242/107.4
[51] Int. Cl.[2] ..................................... B65H 75/48
[58] Field of Search ................. 242/107.4, 107.7; 280/150.5 B; 297/386, 387, 388

[56] References Cited
UNITED STATES PATENTS

| | | | |
|---|---|---|---|
| 3,489,367 | 1/1970 | Kovacs et al. | 242/107.4 |
| 3,667,698 | 6/1972 | Fisher | 242/107.4 |
| 3,722,824 | 3/1973 | Hayashi | 242/107.4 |

*Primary Examiner*—Leonard D. Christian
*Attorney, Agent, or Firm*—Charles E. Leahy

[57] ABSTRACT

A vehicle body restraint belt retractor whose belt reel locking preventing belt extension is actuated by swinging movement of a metallic pendulum. The pendulum is supported between parallel side walls of the retractor housing by a plastic support member in a depending vertical orientation horizontally adjacent the belt reel and swings from this orientation in response to abrupt vehicle acceleration or deceleration in any horizontal direction. A metallic locking member of the retractor has a generally fork-like configuration and is pivotally supported by various arrangements between the side walls of the retractor for movement in a metal-to-metal rattle free manner between a locked position where its tine portions engage the upper side of the belt reel and an unlocked position to which the locking member is gravity biased by its handle portion. The handle portion of the locking member carries a plastic button which is moved upwardly by an upper control portion of the pendulum during its swinging movement so as to move the locking member to locked position and thereby prevent belt extension. The alternating plastic-to-metal-to-plastic relationship of the pendulum support member, the pendulum, and the plastic button on the handle portion of the locking member provides substantially frictionless locking of the retractor in a rattle free manner. A corrugated cover of the retractor is snapped into position between the side walls of the housing with its corrugations extending normal to the planes of these walls so as to prevent movement of the walls toward each other.

1 Claim, 7 Drawing Figures

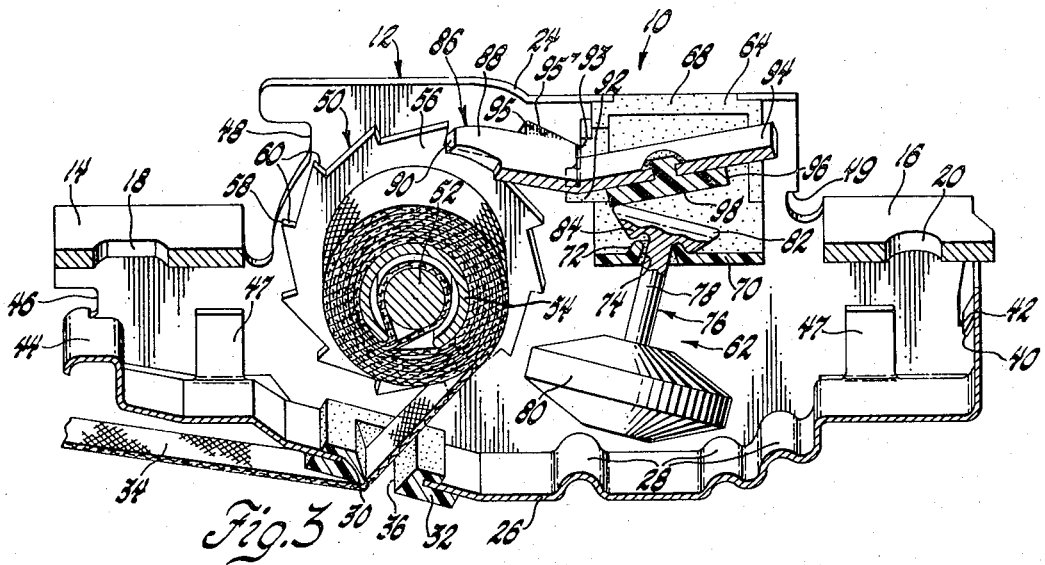
Fig.3
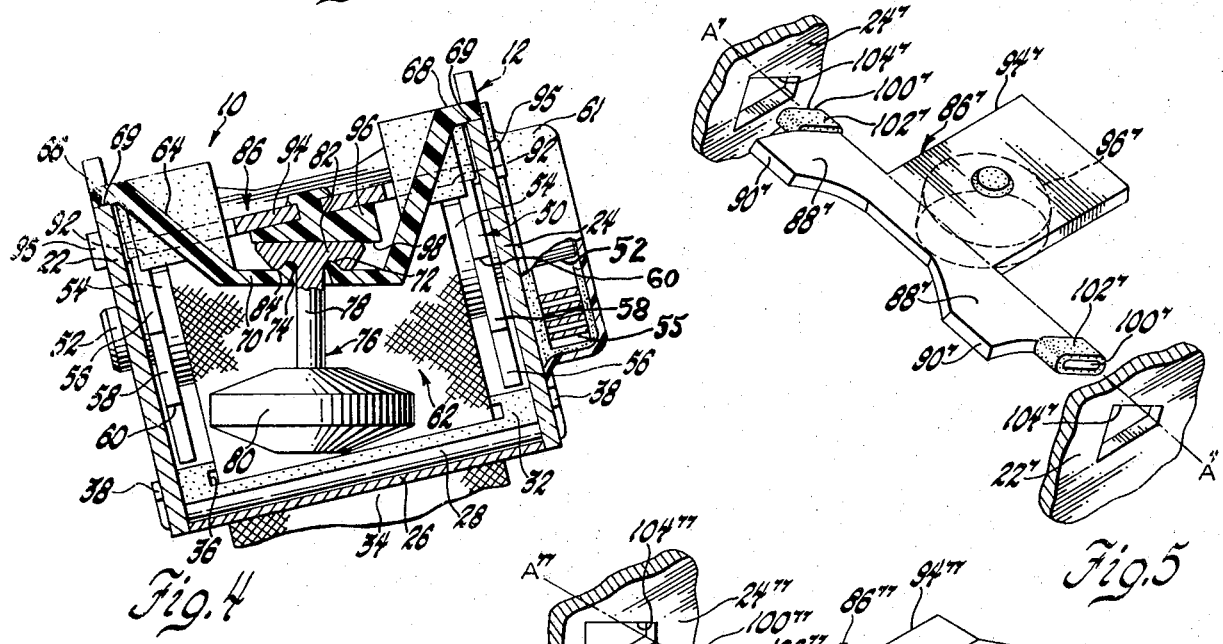
Fig.4
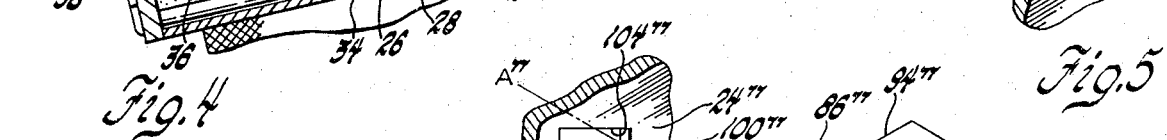
Fig.5
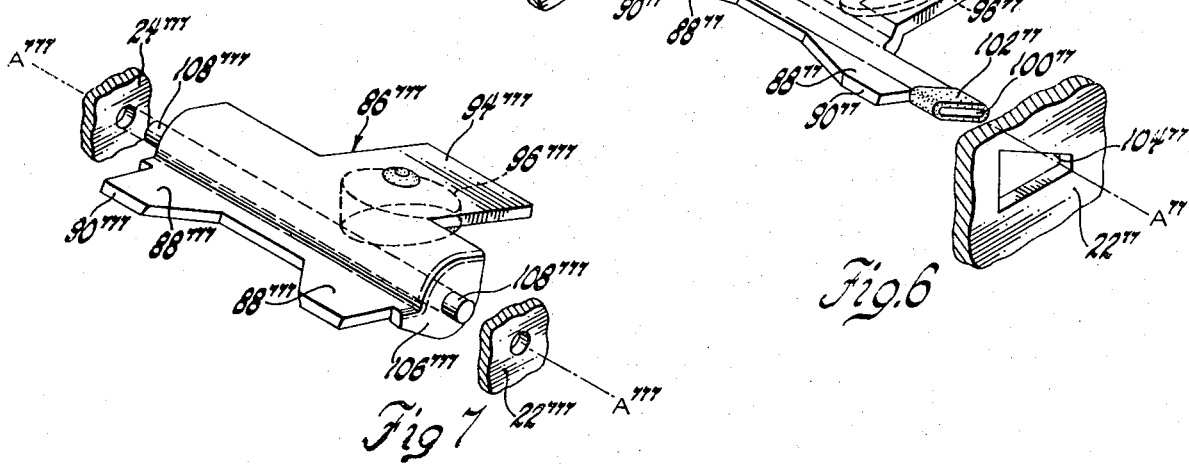
Fig.6
Fig.7

RESTRAINT BELT RETRACTOR WITH PENDULUM ACTUATED LOCKING

BACKGROUND OF THE INVENTION

This application is a division of pending application Ser. No. 348,963, which was filed on Apr. 9, 1973 as a Continuation-In-Part of application Ser. No. 328,877, filed on Feb. 1, 1973 and now abandoned, and both of these earlier applications being assigned to the assignee of the present application.

This invention relates generally to vehicle body restraint belt retractors whose locking preventing belt extension is actuated by swinging movement of a pendulum responsive to abrupt vehicle acceleration or deceleration in any horizontal direction.

Restraint belt retractors utilized in production vehicles generally include a belt reel rotatably mounted within the retractor housing and having annular ratchet configurations on each of the ends of the reel. A locking bar or member is supported by the retractor so as to move between locked and unlocked positions relative to the ratchet configurations on the belt reel. The locking member generally has an elongated rectangular configuration with a pair of projections at each of its ends that carry locking surfaces which are selectively engageable with the ratchet configurations on the belt reel to provide the reel locking.

The manner in which the locking member is moved between its locked and unlocked positions can be accomplished in several different ways. The retractor may be an "automatic locking" type retractor in which a locking mechanism moves the locking member to locked position upon the initial belt retraction after it is first pulled from a fully wound storage position within the retractor. This type of retractor is generally utilized for a lap belt of a restraint belt arrangement since generally there is no necessity to increase the length of a lap belt once it is secured or buckled in an occupant restraining position. The locking may also be accomplished by a reel sensing locking mechanism which moves the locking member to locked position when the belt is pulled out of the retractor at an excessive rate so as to indicate that an occupant restrained by the belt is being subjected to abrupt vehicle acceleration or deceleration. This type of retractor is generally utilized with a shoulder belt so as to allow an occupant to lean forward from the waist at a rate of movement below a predetermined level. This forward movement allows access to forward vehicle components such as the radio controls, the cigarette lighter, etc. Movement of the locking member to locked position can also be accomplished by a pendulum type locking mechanism in which locking is achieved by swinging movement of a pendulum responsive to abrupt vehicle acceleration or deceleration. This type of locking is not responsive to the rate of belt reel rotation. Thus, an occupant restrained by a belt associated with a pendulum type retractor is free to move about at any rate of movement except when the vehicle is being accelerated or decelerated abruptly.

Generally with a retractor having pendulum actuated locking, the locking member is spring biased to unlocked position and the swinging pendulum movement acts against this bias to move the locking member to locked position where the locking projections at each of its ends engage the belt reel to provide reel locking. It is also known for a pendulum type retractor to include a locking member having a control portion located between its locked projections and engaged by the swinging pendulum to provide movement of the locking member to locked position. This type of locking member is located below the belt reel, and the pendulum hangs downwardly below the locking member. Consequently, the vertical distance between the top of the belt reel and the bottom of the pendulum may be so large that the retractor's configuration will prevent its use in certain applications. Nevertheless, when a locking member of a pendulum retractor is gravity biased to unlocked position instead of being spring biased, the expense of fabricating and assembling the normal biasing spring is eliminated and a reduction in the retractor cost is thus achieved.

SUMMARY OF THE INVENTION

The pendulum type restraint belt retractor of this invention utilizes a metallic locking member of a forklike configuration and the handle portion of this member provides a gravity bias that positions the locking member in unlocked position where locking surfaces on its tine portions are maintained out of engagement with ratchet configurations on the ends of the retractor belt reel. The locking member is located adjacent the upper side of the belt reel, and the pendulum of the retractor is supported for swinging movement in any horizontal direction below the handle portion of the locking member in a vertical location generally at the same height as the belt reel so that the retractor's vertical thickness does not have to be substantially greater than the diameter of the belt reel. The pendulum is supported by a plastic support member that extends between side walls of the retractor housing in spaced relationship to the belt reel. The upper end of the swinging pendulum moves a plastic button on the handle portion of the locking member upwardly so as to pivot the locking member to locked position in response to abrupt changes in the rate of vehicle movement. The pivotal support of the locking member is accomplished by integral flange portions on the pendulum support member in one embodiment, and by a pintel pin extending between the side walls and received by apertured tabs of the locking member in another embodiment. These pivotal supports of the locking member provide the retractor with a low level of metal-to-metal rattling noise. The plastic-to-metal-to-plastic relationship of the pendulum support member, the upper end of the pendulum, and the plastic button on the handle portion of the locking member provides substantially frictionless locking actuation of the locking member in a metal-to-metal rattle free manner. A metal cover member of the retractor is snapped into an assembled position between the side walls of the retractor housing, and includes corrugations that extend normal to the planes of these walls so as to provide a strengthening member which will prevent movement of the side walls toward each other. This cover member includes a plastic guide member through which the belt wound on the reel extends outwardly of the retractor. This belt guide member slides into a slot in the cover member to a location between the side walls of the housing, and inverted U-shaped flanges of the cover member at each end of the slot provide continuity to the cover member between opposite sides of the slot.

BRIEF DESCRIPTION OF THE DRAWINGS

The objects, features and advantages of the present pendulum restraint belt retractor are readily apparent from the following detailed description of the preferred embodiments and the drawings in which:

FIG. 3 is a view of the retractor that is taken in a manner similar to FIG. 2 but shows the retractor in a locked condition where belt extension is prevented;

FIG. 4 is a sectional view of the retractor taken generally along line 4—4 of FIG. 2;

FIG. 5 is a perspective view of another embodiment of the fork-like locking member of the retractor but shown so as to be supported in a different manner than the locking member disclosed by FIGS. 1 through 4;

FIG. 6 is another view of a locking member supported in the same manner as the locking member of FIG. 5 but having its handle portion bent so as to accommodate a contact button with a different configuration than the button disclosed by FIGS. 1 through 5; and FIG. 7 is a perspective view of another embodiment of the locking member which is supported by a pintle pin extending between the side walls of the retractor housing.

DETAILED DESCRIPTION OF THE PREFERRED EMBODIMENTS

Figure 1:
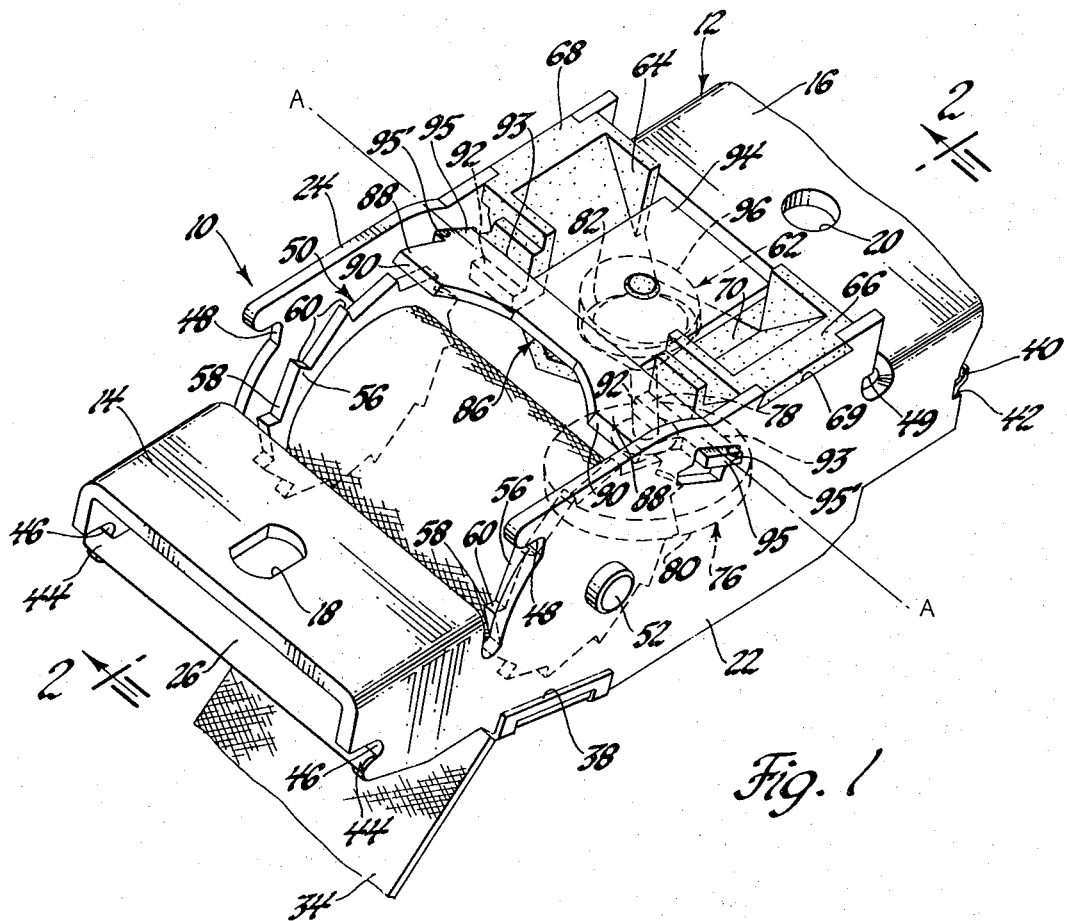
FIG. 1 is a perspective view of a pendulum type restraint belt retractor according to this invention.
Figure 2:
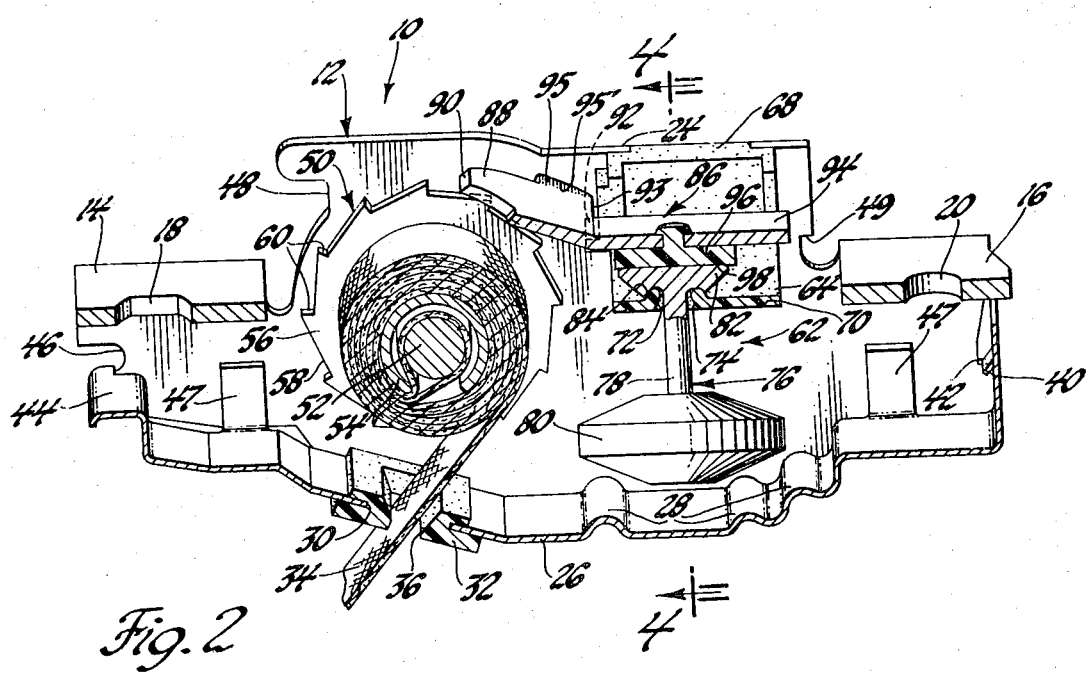
FIG. 2 is a sectional view of the retractor taken generally along line 2—2 of FIG. 1 and showing the retractor in an unlocked condition.

Reference should now be made to FIG. 1 of the drawings where a pendulum type retractor according to this invention is generally indicated by numeral 10. A housing 12 of the retractor includes mounting flanges 14 and 16 adjacent its ends and these flanges define respective apertures 18 and 20 for receiving mounting bolts which are adaptable to secure the retractor in a mounted position on a vehicle body. The retractor housing 2 also includes side walls 22 and 24 which are oriented perpendicular to the planes of the mounting flanges in spaced parallel relationship relative to each other. As can be seen by additionally referring to FIG. 2, the lower side of the retractor housing 12 is closed by a cover member indicated by 26. This cover member is situated between the lower edges of the retractor housing side walls 22 and 24, see FIG. 4 also, and includes corrugated formations 28 which strengthen the cover member and thus resist movement of the side walls toward each other. As seen in FIG. 2, the cover member includes a slot 30 which slidably receives a plastic belt guide 32. An occupant restraint belt 34 is received by a slot 36 in the belt guide and is thereby guided during movement into and out of the retractor housing. A pair of inverted U-shaped flange portions 38 of the cover member, see FIGS. 1 and 4, are located at each end of the slot 30 and provide continuity to the cover member between the opposite sides of this slot. These flange portions are located on the outer sides of the side walls 22 and 24 generally normal to the planes of the adjacent portions of the cover member, while the belt guide 32 is located between these walls so as to be thereby positioned with the cover member assembled.

The cover member 26 may be disassembled from its assembled condition shown by first prying a pair of attachment tangs 40 at its right-hand end out of engagement with cooperating attachment surfaces 42 on the respective side walls 22 and 24. After these tangs and surfaces have been disengaged, the cover member is rotated downwardly so that its right-hand end moves away from the generally horizontal mounting flange 16 of the retractor housing. As this rotation proceeds, the cover member will be rotating about an axis adjacent its left-hand end. This axis extends through a pair of attachment ears 44 on the left-hand end of the cover member. These ears are received by notches 46 in the side walls of the housing that open to the left just below mounting flange 14 of the housing. After the rotation of the cover member has proceeded to a great enough extent so that its right-hand end will clear the lower edges of the retractor side walls, it is moved to the left so that the attachment ears 44 move out of the notches 46. The cover member may then be moved downwardly to allow access to within the retractor housing.

The cover member is reassembled by first positioning the attachment ears 44 within notches 46 and then rotating it upwardly so that attachment tangs 40 are snapped into engagement with the attachment surfaces 42 on the side walls. As the cover member moves upwardly, guide flanges 47, see FIG. 2 and 3, at the opposite ends of the cover member slide along the inside surfaces of the side walls 22 and 24 so as to assure that the cover member will be located between these side walls in its assembled condition. Thus, the corrugated formations 28 are assured of being located between the side walls so as to prevent them from moving toward each other. As the cover member moves to this assembled position, it is important to maintain the belt guide 32 between the planes of the side walls 22 and 24 so it will be located between these walls and thereby positioned with the cover member assembled.

Although it is not shown by the drawings, the top side of retractor 10 is also closed by a suitable cover member which snaps into position. This cover member includes suitable attachment ears that are normally received within notches 48 in the left-hand end of side walls 22 and 24 just above and to the right of mounting flange 14. Attachment surfaces 49 on the right-hand end of the side walls 22 and 24 just above and to the left of mounting flange 16 are engaged by suitable attachment tangs on this upper cover member so as to maintain it in an assembled position. This upper cover member may also include suitable guide portions for guiding it into position. The assembly and disassembly of this upper cover member is generally in the same manner as that of the lower cover member 26, except that these members pivot in opposite directions during their respective movements to and from assembled position.

Above the plastic belt guide 32, the restraint belt 34 is wound onto a belt reel generally indicated by 50. This belt reel includes a shaft 52 rotatably supported between the side walls 22 and 24 of the retractor housing. The inner end of the belt is looped over this shaft 52 and is wound about a rounded horseshoe-shaped drum 54, FIGS. 2 and 3, that is fixed relative to shaft 52. The ends of drum 54 are secured to end plates 56 of the retractor reel. These end plates define annular ratchet configurations 58 that have locking surfaces 60 facing in a direction of reel rotation that corresponds with unwinding movement of belt 34 from the reel. A spring 55, see FIG. 4, normally biases the reel 50 in a belt winding direction and is enclosed by a plastic cap 61 that is suitably secured to the outer side of side wall 24 of the retractor housing as shown in FIG. 4.

Extension of belt 34 from retractor 10 and consequent unwinding from reel 50 is selectively prevented by a vehicle responsive pendulum locking mechanism indicated generally by 62. This locking mechanism includes a plastic support member 64, see FIG. 4 particularly, with a somewhat unsymmetrical U-shaped configuration. The support member includes upper mounting lugs 66 and 68 which are received by respective trapezoidal grooves 69, see FIG. 1, in the side walls 22 and 24 of retractor housing 10 so as to retain this support member in position. Between these mounting lugs, the support member extends downwardly and includes a horizontally extending support portion indicated by 70 as best seen in FIGS. 2 through 4. This support portion is skewed with respect to the planes of the mounting flanges 14 and 16 of the retractor housing. The reason for this angularity is because this particular retractor is utilized as a shoulder belt retractor and is adapted to be mounted on a vehicle body roof rail along the outer edge of the roof, and the roof rail is oriented in a similar angular relationship relative to the horizontal as is the support portion 70 to the planes of mounting flanges 14 and 16. Thus, this positioning is necessary to maintain the support portion in a horizontal orientation when the retractor is mounted on the roof rail. This consideration of course dictates that the retractors utilized on opposite sides of the vehicle body, that is to say the roof rails associated with the opposite sides of the roof, must necessarily have the support member 64 mounted on the housing in opposite orientations in order to maintain its support portion 70 in this horizontally extending orientation.

The support portion 70 of support member 64 includes an upwardly extending annular support lip 72 which defines an aperture 74. A pendulum 76 of the locking mechanism 62 includes an arm 78 whose lower end attaches a weight 80 and whose upper end extends upwardly through the aperture 74 in support portion 70. Above the support portion 70, the upper end of pendulum arm 78 mushrooms outwardly and defines an annular control portion 82 whose lower side includes an annular support lip 84, FIGS. 2 and 4. The annular support lip 72 on support portion 70 and the annular support lip 84 on control portion 82 engage each other and position the pendulum with arm 78 normally depending downwardly in a vertical orientation.

The locking mechanism 62 also includes a locking member 86 with a generally fork-like shape. This locking member includes tine portions 88 carrying locking surfaces 90 that are selectively engageable with the locking surfaces 60 at the upper side of the end plates of reel 50 so as to prevent belt extension. Integral flange portions 92 of the plastic support member 64, see the hidden line indication of these portions in FIG. 1, support the locking member along its edge portions 93 for rotational movement about an axis A located between the belt reel and pendulum 76. Adjacent axis A, the tine portions 88 of the locking member merge with its elongated handle portion indicated by 94. The locking member also includes mounting ears 95 adjacent axis A, and these ears are received within apertures 95' in the side walls 22 and 24 of the retractor housing. The configurations of these apertures prevent the mounting ears from slapping against the upper and lower edges of the apertures as the locking member moves between its locked and unlocked positions. However, should the support member 64 be unable to provide a support maintaining the locking member in locked position upon belt tensioning, engagement of the edge portions 93 of the mounting ears 95 with the side walls 22 and 24 will support the locking member in locked position.

The handle portion 94 of the locking member carries a wedge-shaped plastic button 96, see FIG. 4, which has a lower control surface 98 engageable with the control portion 82 on the upper end of pendulum arm 78. This handle portion 94 normally provides a gravity bias which rotates it clockwise about axis A and positions the locking member in the unlocked position shown by FIG. 2. When the vehicle carrying retractor 10 is subjected to any horizontal acceleration or deceleration of a predetermined abruptness, the pendulum 76 swings from the vertical orientation of FIG. 2 to a tilted position such as that shown by FIG. 3. This swinging pendulum movement causes the control portion 82 at the upper end of the pendulum arm to move the contact button 96 upwardly and thus pivot the locking member 86 about axis A. This pivoting movement of the locking member moves it counterclockwise from the FIG. 2 unlocked position to the FIG. 3 locked position where the locking surfaces 90 on the tine portions 88 are engageable with a selected pair of the locking surfaces 60 on the upper side of the belt reel to thereby prevent belt extension from the retractor and unwinding from the reel. Thus, an occupant using belt 34 will be restrained at all times when the vehicle is subjected to abrupt acceleration or deceleration. After such a change in vehicle motion subsides, the gravity bias of the handle portion of locking member 86 returns it to unlocked position as the pendulum swings back to its vertical depending relationship.

The locking engagement of the locking member 86 with the upper side of the belt reel 50 allows the pendulum 76 to be located generally in horizontal alignment with the belt reel. This alignment allows the retractor to have a vertical thickness which is not appreciably larger than the diameter of the reel. Such would not be the case if the locking engagement were at the lower side of the reel since the pendulum would then have its upper end adjacent the low side of the reel and would hang downward from that location. The vertical thickness of the retractor would then have to be approximately equal to the diameter of the belt reel added to the length of the pendulum, and might give the retractor a configuration making it impractical for certain applications.

The alternating plastic-to-metal-to-plastic relationship between the support portion 70 of support member 64, the metal control portion 82 of the upper end of pendulum arm 78, and the plastic button 96 on the handle portion 94 of locking member 86 provides substantially frictionless locking actuation of retractor 10 and also eliminates metal-to-metal contact of these components that could cause rattling noise of the retractor. Also, the manner in which integral flange portions 92 of plastic support member 64 support the locking member 86 without metal-to-metal slapping of the mounting ears 95 against the upper and lower edges of the apertures 95' during movement of the locking member between locked and unlocked positions likewise reduces rattling noise of the retractor.

FIG. 5 discloses another embodiment of the locking member which is indicated by 86'. This locking member has integral mounting ears 100' which are covered by a suitable plastic covering 102'. This plastic covering may be provided by a coating operation or alternately may be provided by slipping short lengths of plastic tubing over the mounting ears. These mounting ears are received within wedge-shaped apertures 104' in the retractor housing side walls 22' and 24' and thus support the locking member for movement about an axis A' between its locked and unlocked positions.

FIG. 6 discloses another embodiment of the locking member which is indicated by 86''. This locking member is supported in the same manner as the locking member 86' disclosed by FIG. 5, but has a handle portion 94'' with a somewhat different configuration. The cross section of this handle portion has a slight ogee configuration when viewed through a plane normal to the longitudinal length of the handle portion. This configuration is provided so that the contact button 96'' does not have to have a wedge-shaped configuration as do the other buttons which have been disclosed, but rather has a frustoconical configuration.

FIG. 7 discloses another embodiment of the locking member which is indicated by 86'''. This locking member includes apertured tabs 106''' that receive a pintle pin 108''' extending between the retractor side walls 22''' and 24'''. These tabs and the pin thus support the locking member for pivotal movement between locked and unlocked positions about an axis A''' that is concentric with the longitudinal axis of the pin, and this movement takes place in a metal-to-metal rattle-free manner.

From the foregoing description it is apparent that the present invention provides an improved vehicle body restraint belt retractor of the pendulum actuated locking type.

What is claimed is:

1. A restraint belt retractor for a vehicle comprising, a metallic retractor housing adaptable to be mounted on the vehicle and including a pair of spaced generally parallel opposed walls, each wall defining an attachment surface and a notch that are spaced from each other, a corrugated cover including a pair of ears and a pair of tangs, the ears of the cover being respectively received by the notches of the walls so that the cover may be rotated to an assembled position where the tangs of the cover respectively snap into engagement with the attachment surfaces of the walls to hold the cover in position and where the corrugations of the cover are located between and extend normal to the planes of the walls so as to engage these walls and thereby prevent movement of the walls toward each other, belt reel means rotatably mounted between the opposed walls of the retractor housing for movement about a generally horizontal axis and receiving a restraint belt that is wound and unwound relative thereto during such rotation, the belt reel means including annular ratchet means generated about the axis of its rotation at each of its ends so as to define upper and lower sides of the reel means, the ratchet means having locking surfaces facing in the belt unwinding direction of rotation, spring means biasing the reel means in a belt winding direction, a locking member having a generally fork-like configuration with spaced tine portions having locking surfaces at the ends thereof and with an elongated handle portion extending in an opposite direction to the tine portions, means mounting the locking member between the opposed walls of the retractor housing so as to extend generally horizontally adjacent the upper side of the reel means and so as to be pivotally movable between locked and unlocked positions about an axis parallel to the rotational axis of the reel means and extending transversely of the longitudinal axis of the handle portion adjacent the end thereof in proximity to the tine portions, this axis of locking member movement being generally in vertical alignment with the upper side of the reel means, the locking surfaces of the tine portions being engageable with the locking surfaces of the ratchet means at the upper side of the reel means at each end thereof when the locking member is in locked position so as to prevent belt unwinding movement of the reel means, the handle portion of the locking member having a lower side that faces downwardly and this handle portion normally providing a gravity bias that positions the locking member in unlocked position where the handle portion is located downwardly from the locked position and where the tine portions of the locking member are located upwardly from the locked position so as to disengage the upper side of the reel means and to thereby allow belt unwinding movement of the reel means, pendulum support means extending between the opposed walls of the retractor housing and including a fixed horizontally extending annular support portion of a plastic construction that defines an aperture below the handle portion of the locking member in horizontally spaced relationship to the reel means and in vertical alignment therewith, a pendulum with a lower weight and an arm whose lower end is secured to the weight and whose upper end extends upwardly through the aperture in the pendulum support means, the pendulum being in vertically aligned relationship with the reel means so as not to substantially increase the vertical thickness of the retractor, the upper portion of the pendulum including an annular portion seating against the annular plastic support portion of the pendulum support means so as to position the pendulum in a depending vertical orientation, and a control portion on the upper end of the pendulum arm which engages the lower side of the handle portion of the locking member during swinging pendulum movement from its vertical orientation in response to abrupt vehicle acceleration or deceleration in any horizontal direction such that the handle portion is moved upwardly against its gravity bias to position the locking member in locked position so that belt unwinding movement of the reel means is thereby prevented.

* * * * *